Aug. 4, 1953
D. C. COX
2,647,670
LEMON BOX LOADER
Filed Aug. 11, 1949
3 Sheets-Sheet 1
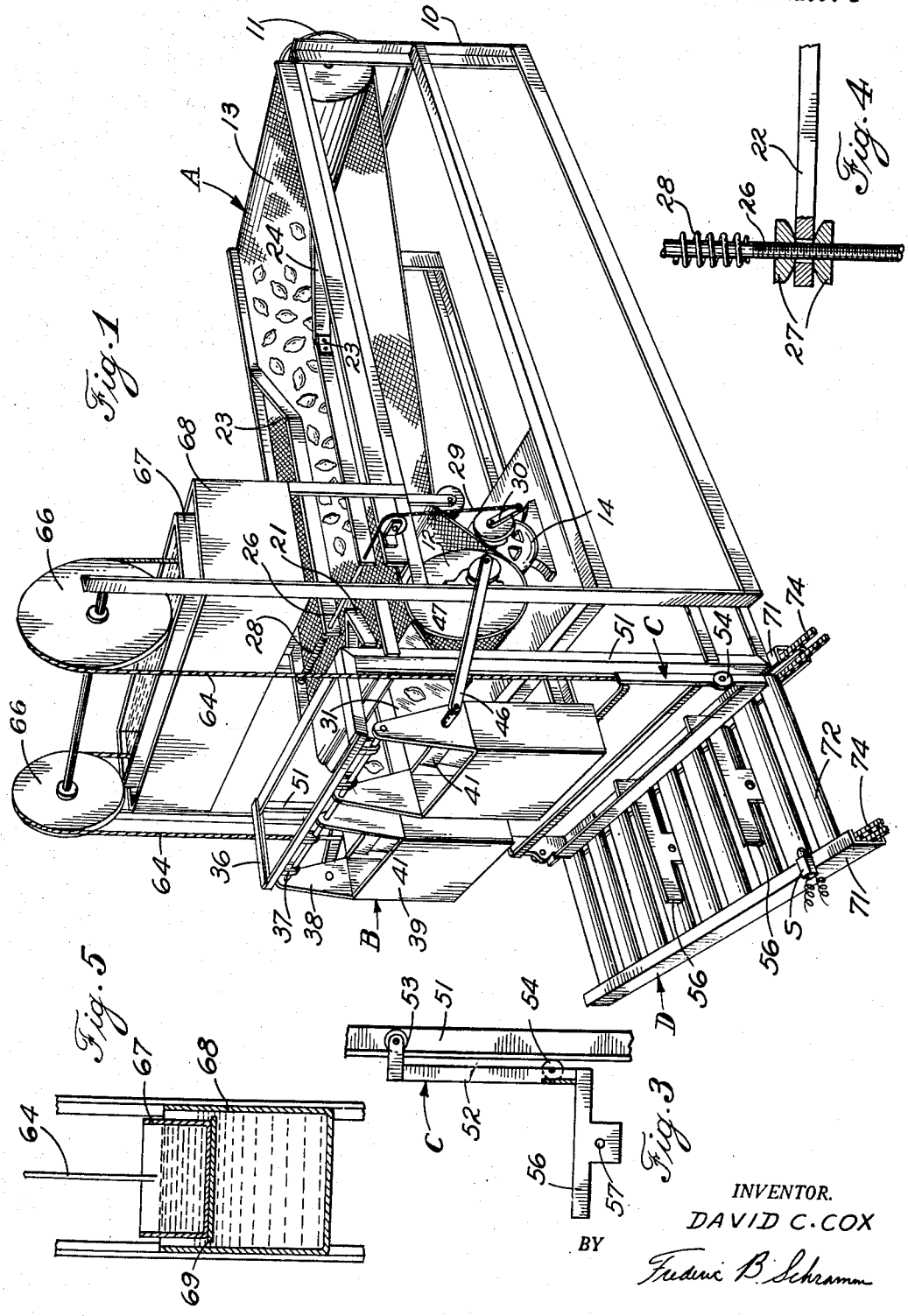
INVENTOR.
DAVID C. COX
BY
Frederic B. Schramm
ATTORNEY

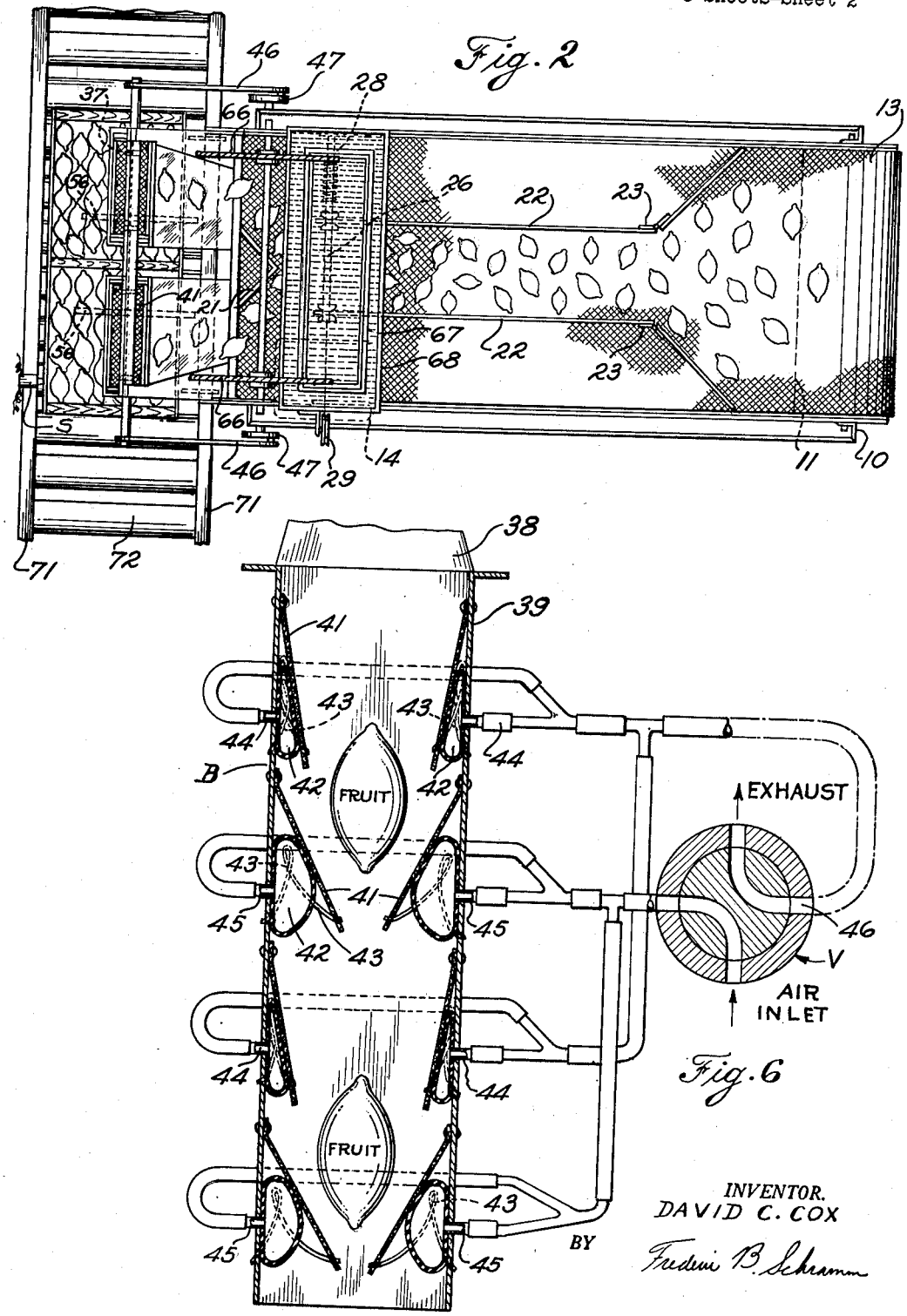

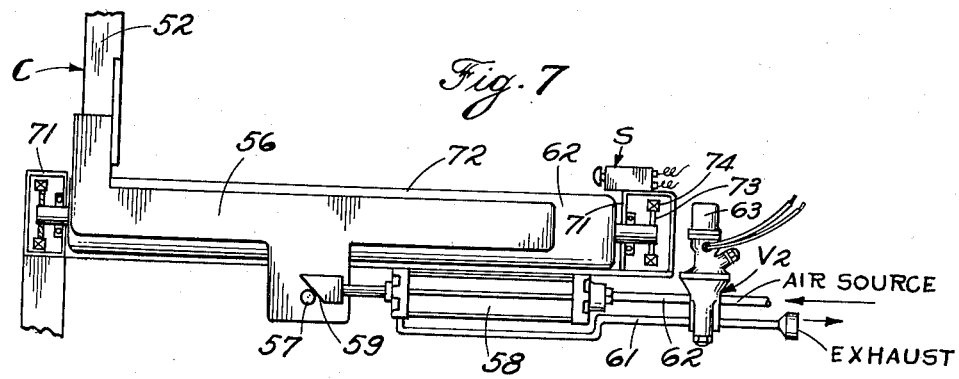

Patented Aug. 4, 1953

2,647,670

UNITED STATES PATENT OFFICE 2,647,670

LEMON BOX LOADER

David C. Cox, Grand Rapids, Mich., assignor to Electric Sorting Machine Company, Grand Rapids, Mich., a corporation of Michigan Application August 11, 1949, Serial No. 109,760

12 Claims. (Cl. 226—2)

This invention relates to apparatus for loading and distributing fragile or delicate articles into containers. Although the invention is not limited for use in connection with the loading of any particular articles, the embodiment to be described is particularly adapted for the loading of fruit such as lemons into divided crates or containers.

It is well-known that lemons must be handled with care because if they are dropped for any appreciable distance while being loaded into the relatively deep crates employed in the trade, discoloration and rot may originate at the bruised areas. It is an object of the invention to convey and load fragile articles rapidly but without damage. More specifically, it is an object of the invention to load fragile articles such as lemons into crates or containers by gravity feed and to limit the free drop of the articles, thereby preventing bruising and damage thereto. This is accomplished by delivering by means of a belt conveyor articles received from a sorting machine or other apparatus or source to a specially arranged chute or chutes which contain alternately opening and closing barriers such as flaps or the like that are cycled to limit the free fall of the articles. The chutes may be inserted into the empty containers and the support for the containers is such that the containers are gradually lowered as they are filled which further reduces to a safe distance the fall of the articles as they leave the chute.

Another object of the invention is to cause divided containers to be loaded evenly. This is accomplished by providing a chute for each half of the divided container and by providing means for dividing the articles evenly between the chutes. In addition, means are provided to oscillate the chutes to and fro in the direction of motion of the conveyor to spread the articles evenly in the container.

Another object of the invention is alternate stoppage of the delivery conveyor and the chute cycling apparatus, and the removal of containers from under the chutes when the latter are filled. This is accomplished by mechanism and electrical controls therefor actuated by the closing of circuits when a switch is engaged by the container as it reaches its lowermost or filled position. The apparatus is arranged so that when the container reaches this position the chute cycling means are stopped, the chute is raised and the crates or containers carried clear of the chutes by a live conveyor. As will be explained in detail presently, the apparatus is arranged so that when an empty container is brought under the chutes by the live conveyor the switch is again actuated to allow the platform supporting the container to rise toward the chutes and to stop the live conveyor that transports the containers.

The manner in which these objects and advantages may be accomplished will be apparent from the following description of a preferred embodiment of the invention specifically adapted to handle citrus fruits such as lemons or the like.

In the drawings:

Fig. 1 is a perspective view of the apparatus;
Fig. 2 is a plan view thereof;
Fig. 3 is a partial view of the carriage support;
Fig. 4 is a detail of the divider guide assembly;
Fig. 5 is a section through the counterbalancing tank for the carriage;
Fig. 6 shows the cycling chutes and the diagrammatic connection of the control valve therefor;
Fig. 7 is a detail of the carriage support actuating mechanism;
Fig. 8 is a schematic diagram of a preferred system of control for the apparatus; and,
Fig. 9 is an enlarged view of the dash pot.

As best seen in Fig. 1 the loading apparatus comprises a belt delivery conveyor A, a loading arm or chute assembly B, a container supporting carriage C, and a live roller assembly D for bringing containers into and away from their loading position. The apparatus is built about a framework indicated generally at 10 that may be fabricated of structural shapes in accordance with usual design practice so that the details of the framework assembly will not be described.

The delivery conveyor assembly A includes an idle roll 11 and a driven roll 12 over which is passed a fabric belt 13. A conveyor driving motor 14 drives the driven roll by any suitable gearing well-known in the conveyor art and forming no part of the invention. In order to insure that each of the two chutes of the loading assembly B will receive substantially the same number of articles a divider 21 is disposed at the delivery end of the conveyor belt 13 and a pair of swinging arms 22 are hinged as at 23 to fixed guides 24. A rod 26 is jointed to the free ends of arms 22 as best seen in Fig. 4 wherein the rod may pass through an aperture in arms 22, the latter being restrained by convex nuts 27. A spring 28 urges the rods 22 to one side of the conveyor whereas the cable 29 connecting to a crank 30 driven by the motor 14 holds the swinging arms toward the other side of the conveyor. The stroke and spacing of arms 22 is such that if a line of lemons were progressing exactly down the midline of conveyor belt 13, the arms 22 would just come up to but not move the line of lemons. Thus, as the arms 22 oscillate equal quantities of lemons are alternately directed to one or the other of the chutes or loading arms in the assembly B.

An apron 31 directs the lemons into the loading chutes. The loading arm assembly B is mounted on an overhanging bracket 36 integral with the framework 10. Straps 37 pivotally suspend the loading chutes by means of rods connected to ears 38 which support the box-like structure 39. As best seen in Fig. 6 each loading arm or chute is provided with a plurality of movable barriers 41 which, in the preferred form shown, are in the nature of flexible flaps preferably of rubberized fabric material riveted to opposed walls of the box 39 along their upper edges. Relatively light wire springs 43 urge the flaps toward their mounting walls. Disposed behind the flaps are inflatable flexible bulbs or puffer bags 42 which when inflated with air or other fluid cause the flaps to approach each other along their lower edges so that they serve as a barrier to catch the lemons or other articles.

Means are provided so that the bags are inflated in alternate pairs. A two-way reversible valve V, the construction of which is not critical to the invention, is connected in the preferred construction to a source of compressed air. Alternate pairs of flaps are connected by means of conduits 44 to one port in the valve and the remaining pairs of flaps by means of conduits 45 to the other port. With this construction as the valve is rotated, alternate pairs of bags will be inflated and other pairs deflated. The inflated pairs of bags act as barriers to catch the articles and the other half are withdrawn to release the articles. Thus, the fall of articles through the loading arm or chute is limited to the spacing between pairs of flaps. Although the conveyor belt 13 may be driven at such a rate of speed that a large number of articles is delivered to the container per unit of time and efficient economical loading is accomplished, this occurs without danger of bruising or damaging the articles.

As seen in Fig. 1, the loading arms are oscillated in a direction parallel to the line of motion of the belt conveyor in order to spread the articles evenly in the container, which motion is accomplished by a link 46 pivoted to each box and connected to a crank 47 turned by suitable means such as the drive roller 12 of the conveyor.

As mentioned briefly means are provided for supporting containers or crates so that they may be gradually lowered as they are filled thereby reducing the fall between the final sets of flaps in the chutes and the top layer of articles in the containers. As seen in Fig. 1 a pair of vertical tracks 1 form part of the framework, and as seen in Fig. 3 the carriage assembly C is slidable along the tracks and is mounted thereon by means of rollers 53 and 54. A pair of supporting arms 56 are integral with the carriage and cooperate to form platform means for supporting the crates.

As best seen in Fig. 7 each arm 56 is fitted with a pin 57 in order that it may be retracted below the top surface of the crate conveyor live rollers. The retracting mechanism includes a double-acting air cylinder 58 to the piston rod of which is fastened a wedge or cam 59. Conduits 61 and 62 lead from the two ends of the cylinder to a reversing valve $V_2$ magnetically controlled by a solenoid indicated at 63. When the solenoid is actuated conduit 62 is connected to the air source so that if pin 57 is in the zone of cam 59 platform arms 56 will be depressed.

A live roller conveyor assembly is provided to bring empty containers under the chutes and to transport the filled containers clear of the chutes. This assembly, as seen in Figs. 1 and 7, comprise spaced channels 71 which pivotally mount rollers 72, the latter being driven by means of sprockets 73 and chains 74. A suitable motor and gearing are provided for chain 74 in accordance with the usual conveyor practice, details of which form no part of the invention.

A control system is provided in order to start the conveyor motor, and the motor which cycles the inflatable puffer bags, when an empty container is brought under the chutes by means of the rollers 72. The control system serves also to stop the rollers 72 at this time and release platform arms 56 so that the floats 67 may raise the crate or container close to the chutes. It is also a function of the control mechanism to stop delivery of articles to the containers when they are full and to activate the rollers 72 to remove the filled container. Suitable arrangement for accomplishment of these results is illustrated diagrammatically in Fig. 8, it being understood that the electrical and mechanical details of the various elements going to make up the controls are not critical to the invention so long as the aforesaid actions are obtained.

The entire unit is controlled by a sensing switch S disposed adjacent the roller conveyor so that it is engaged both when a filled box reaches its lowermost position and when an empty box reaches its loading position. Switch S activates a stepping assembly in the form of a solenoid pawl 81 which is lifted when switch S is closed. The pawl engages a ratchet 82 fixed to a plate that contains lands 83 and recessed portions 84. The number of teeth on the ratchet 82 is equal to the total number of lands and depressions 83 and 84. The lands and depressions may activate switch $S_1$ which when closed energizes the solenoid of the main relay R. Normally closed contacts 91 of relay R energizes the solenoid of the second relay $R_1$ which has normally open contacts 92. When contacts 92 are closed they energize the belt conveyor motor 12 and a puffer valve motor for rotating or otherwise moving the puffer valve V.

A delayed action device such as a dash pot 93 is incorporated in relay $R_1$ and arranged to slow down the closing action of the contacts 92. As seen in Fig. 9 the dash pot 93 includes a cylinder 94, piston 95, and a check valve 96 therein, the arrangement being such that piston 95 goes freely in a direction tending to open contacts 92, but is damped to the closing of check valve 96 in a direction tending to close those contacts.

The essential elements of the circuit having been described, the operation thereof will now be explained. Assume that a fruit box is in the process of being loaded so that the cam 59 is retracted and platform means 56 are above the rollers 72. This is the situation illustrated in the circuit diagram of Fig. 8 and under these circumstances it can be seen that a depression 84 of the stepping switch is disposed over the operator of switch $S_1$ so that that switch is likewise open and the solenoid pawl 81 is not energized. With the switches both open, normally closed contacts 91 of relay R energize the solenoid of relay $R_1$ so that normally open contacts 92 of the latter relay are closed. With this circuit established both the belt conveyor motor 12 and the motor for the puffer valve are energized so that the conveyor is delivering fruit to the chutes and the chutes are feeding by gravity to the container. This condition obtains until the weight of the fruit in the container causes it to approach its lowermost position whereupon the container engages a suitable actuator for switch S, closing the switch and energizing the solenoid for stepping switch pawl 81.

The stepping switch is now rotated one notch so that a land 83 actuates and closes switch $S_1$. This energizes the solenoid for relay R so that the contacts 91, normally closed, are opened whereupon the solenoid for relay $R_1$ is de-energized and normally open contacts 92 of that relay fall out stopping the conveyor motor and the puffer valve motor. The dash pot 93 offers little resistance to this action. Simultaneously, normally open contacts 97 of relay R close, energizing the solenoid 63 of the air valve $V_1$ to direct compressed air behind the piston in cylinder 58. This causes cam 59 to engage pin 57 on the platform 56 and depress it below the surface of rollers 72. Closing the contacts 92 likewise energizes the roller conveyor motor so that the filled container is quickly removed from under the chutes, it being understood that due to the lowering action of the conveyor during filling the chutes are clear of the box.

When the new container is brought into position by the rollers 72 and their driving motor, it strikes the actuator for the control switch S which steps pawl 82 another notch bringing the next notch 84 over the actuator for switch $S_1$. This restores the circuit to the condition shown in Fig. 8 wherein the roller conveyor motor is stopped and the platform depressing cylinder retracted, freeing the platform 56 which is lifted over the chutes by the float 67. The close fit of float 67 in the tank 68 provides a dash pot action which causes the float 67 to fall gently and the fruit box to be lifted gently. At the same time the solenoid for relay $R_1$ is energized to start the conveyor and the puffer valve motor, but the action of the dash pot delays the closing of contacts 92 somewhat so that the operation just described may be completed and the box lifted to a position adjacent the mouth of the chutes before articles are delivered to the container.

It can be seen that I have provided a loading device which limits the free fall of the articles to a distance not likely to damage or bruise them. Divided containers are evenly loaded with my apparatus and the operation thereof is entirely automatically controlled by the master switch, energized by the filled and emptied crates or containers. The action of the container lift device may be adjusted by varying the size of the baffle 69 or the amount of liquid in the float 67 or both. The structure of both swinging guide arms 22 and the distributing link 46 as well as their speed may be adjusted by suitable means known to mechanics skilled in the art in order to obtain uniform delivery and even spread of articles in the container.

I contemplate that various modifications and details of construction of the preferred embodiment may be made without departing from the essence of the invention and its mode of operation as defined in the appended claims.

What is claimed is:

1. A gravity feed device for transporting fragile articles comprising a chute arranged to receive at the upper end thereof fragile articles, a plurality of axially-spaced flaps hinged at their upper edges to the wall of said chute, inflatable bags between said flaps and their mounting wall for moving each of said flaps from a first position adjacent the mounting wall wherein articles may fall past the flap to a second position spaced from the mounting wall wherein the flap may catch articles in the chute, fluid conduit means connected to said bags, and cycling valve means connected to said conduit means and arranged to cause adjacent flaps to move alternately whereby the maximum fall of an article in the chute is limited by the axial spacing of said plates.

2. Apparatus for loading containers with fragile articles comprising a belt conveyor for transporting articles, a platform beneath the delivery end of said conveyor for supporting an article container, chute means arranged to receive at the upper end thereof articles from the conveyor and deposit the articles in the container, said chute means having mounted on a wall thereof a plurality of movable plates axially spaced along said chute means, operator means for moving each of said plates from a first position adjacent the mounting wall wherein articles may fall past the plate to a second position spaced from the mounting wall wherein the plate may catch articles in the chute, cycling means for said operator means that causes adjacent plates to move alternately whereby the maximum fall of an article in the chute is limited by the axial spacing of said plates, and means for supporting said platform and arranged to lower said platform as the container is filled thereby reducing to a minimum the fall of articles leaving said chute.

3. Apparatus for loading containers with fragile articles comprising a belt conveyor for transporting articles, a platform beneath the delivery end of said conveyor for supporting an article container, chute means arranged to receive at the upper end thereof articles from the conveyor and deposit the articles in the container, said chute means having mounted on a wall thereof a plurality of movable plates axially spaced along said chute means, operator means for moving each of said plates from a first position adjacent the mounting wall wherein articles may fall past the plate to a second position spaced from the mounting wall wherein the plate may catch articles in the chute, cycling means for said operator means that causes adjacent plates to move alternately whereby the maximum fall of an article in the chute is limited by the axial spacing of said plates, and means for supporting said platform and arranged to cause said platform to lower as the container is filled thereby reducing to a minimum the fall of articles leaving said chute comprising a counterbalance float for said platform and a tank of liquid in which said float is suspended.

4. Apparatus for loading containers with fragile articles comprising a belt conveyor for transporting articles, a platform beneath the delivery end of said conveyor for supporting an article container, chute means arranged to receive at the upper end thereof articles from the conveyor and deposit the articles in the container, and means for supporting said platform and arranged to cause said platform to lower as the container is filled thereby reducing to a minimum the fall of articles leaving said chute means, said platform supporting means comprising a counterbalance float for said platform and a tank of liquid in which said float is suspended for increasing the counterbalance effect as the platform is lowered.

5. Apparatus for simultaneously and equally loading divided containers with discrete articles comprising support means for a container, a pair of delivery chutes above said support means, a conveyor to deliver articles to said chutes, a divider at the delivery end of said conveyor open to both chutes, laterally spaced guides leading up to said divider, and means to drive said conveyor and simultaneously oscillate said guides laterally about the midplane of the conveyor to center the line of articles with the divider in order that equal quantities of articles are delivered to each chute.

6. Apparatus for simultaneously and equally loading divided containers with discrete articles comprising support means for a container, a pair of delivery chutes above said support means, a conveyor to deliver articles to said chutes, a divider at the delivery end of said conveyor open to both chutes, laterally spaced guides leading up to said divider, means to drive said conveyor and simultaneously oscillate said guides laterally about the midplane of the conveyor to center the line of articles with the divider in order that equal quantities of articles are delivered to each chute, means pivotally suspending said chutes about an axis transverse to motion of the conveyor, and means to oscillate said chutes in the line of conveyor motion to distribute the articles evenly in the container.

7. Apparatus for simultaneously and equally loading divided containers with fragile, discrete articles comprising support means for a container, a pair of delivery chutes above said support means, a conveyor to deliver articles to said chutes, a divider at the delivery end of said conveyor open to both chutes, laterally spaced guides leading up to said divider, means to drive said conveyor and simultaneously oscillate said guides laterally about the midplane of the conveyor to center the line of articles with the divider in order that equal quantities of articles are delivered to each chute, means pivotally suspending said chutes about an axis transverse to motion of the conveyor, means to oscillate said chutes in the line of conveyor motion to distribute the articles evenly in the container, and means to lower said container as it is filled to limit the fall of articles into the container.

8. Apparatus for simultaneously and equally loading divided containers with fragile articles comprising support means for a container, a pair of delivery chutes above said support means, a conveyor to deliver articles to said chutes, a divider at the delivery end of said conveyor open to both chutes, laterally spaced guides leading up to said divider, means to laterally oscillate said guides about the midplane of the conveyor to center the line of articles with the divider in order that equal quantities of articles are delivered to each chute, a plurality of movable plates mounted on and axially spaced along the wall of each chute, operator means for moving each of said plates from a first position adjacent the mounting wall wherein articles may fall past the plate to a second position spaced from the mounting wall wherein the plate may catch articles in the chute, cycling means for said operator means that causes adjacent plates to move alternately whereby the maximum fall of an article in the chute is limited by the axial spacing of said plates, means pivotally suspending said chutes about an axis transverse to motion of the conveyor, means to oscillate said chutes in the line of conveyor motion to evenly distribute the articles in the container, and means to lower said container as it is filled to limit the fall of articles into the container.

9. Apparatus for simultaneously loading a plurality of sections of relatively deep divided containers with fragile articles comprising a conveyor for transporting articles, platform means beneath the delivery end of said conveyor for supporting an article container, chutes for said container sections arranged to receive at the upper end thereof articles from the conveyor and deposit from the lower end thereof the articles in the container, divider means on said conveyor for continuously dividing the articles equally between said chutes, barrier means in said chutes for retarding the dropping of articles passing through the chutes, means for causing relative horizontal movement of the lower ends of said chutes with respect to the container to deposit the articles in the container substantially uniformly, and means for separating said platform and chutes at the rate that the container is filled, thereby holding to a minimum the fall of articles leaving said chutes during the entire filling operation.

10. Apparatus for loading relatively deep containers with fragile articles comprising a conveyor for transporting articles, platform means beneath the delivery end of said conveyor for supporting an article container, chute means arranged to receive at the upper end thereof articles from the conveyor and deposit from the lower end thereof the articles in the container, barrier means in said chute means for retarding the dropping of articles passing through the chute means, means for causing relative horizontal movement of the lower end of said chute means with respect to the container to deposit the articles in the container substantially uniformly, and means for separating said platform and chute means at the rate that the container is filled, thereby holding to a minimum the fall of articles leaving said chute during the entire filling operation.

11. Apparatus for loading relatively deep containers with fragile articles comprising a conveyor for transporting articles, platform means beneath the delivery end of said conveyor for supporting an article container, chute means arranged to receive at the upper end thereof articles from the conveyor and deposit from the lower end thereof the articles in the container, barrier means in said chute means for retarding the dropping of articles passing through the chute means, means for moving the lower end of said chute means back and forth in the container to deposit the articles in the container substantially uniformly, and means for separating said platform and chute means at the rate that the container is filled thereby holding to a minimum the fall of articles leaving said chute during the entire filling operation.

12. Apparatus for loading relatively deep containers with fragile articles comprising a conveyor for transporting articles, platform means beneath the delivery end of said conveyor for supporting an article container, chute means arranged to receive at the upper end thereof articles from the conveyor and deposit from the lower end thereof the articles in the container, barrier means in said chute means for retarding the dropping of articles passing through the chute means, means for moving the lower end of said chute means back and forth in the container to deposit the articles in the container substantially uniformly, and means for supporting said platform means comprising a counterbalance float connected to said platform means and a tank of liquid in which said float is suspended, said float being constructed and arranged to permit the weight of articles deposited in the container to lower said platform means at the rate that the container is filled, thereby holding to a minimum the fall of articles leaving said chute during the entire filling operation.

DAVID C. COX.

References Cited in the file of this patent

UNITED STATES PATENTS

| Number | Name | Date |
| --- | --- | --- |
| 759,204 | Van Nette | May 3, 1904 |
| 952,352 | Pieper | Mar. 15, 1910 |
| 993,696 | Manson | May 30, 1911 |
| 1,562,929 | Trovaton | Nov. 24, 1925 |
| 1,849,256 | Trovaton | Mar. 15, 1932 |
| 2,311,706 | Sowden | Feb. 23, 1943 |
| 2,451,104 | Lowe | Oct. 12, 1948 |

FOREIGN PATENTS

| Number | Country | Date |
| --- | --- | --- |
| 290,791 | Great Britain | May 24, 1928 |
| 382,376 | Great Britain | Oct. 27, 1932 |
| 643,599 | Germany | Apr. 13, 1937 |
| 658,701 | Germany | Apr. 19, 1938 |